Patented May 7, 1935

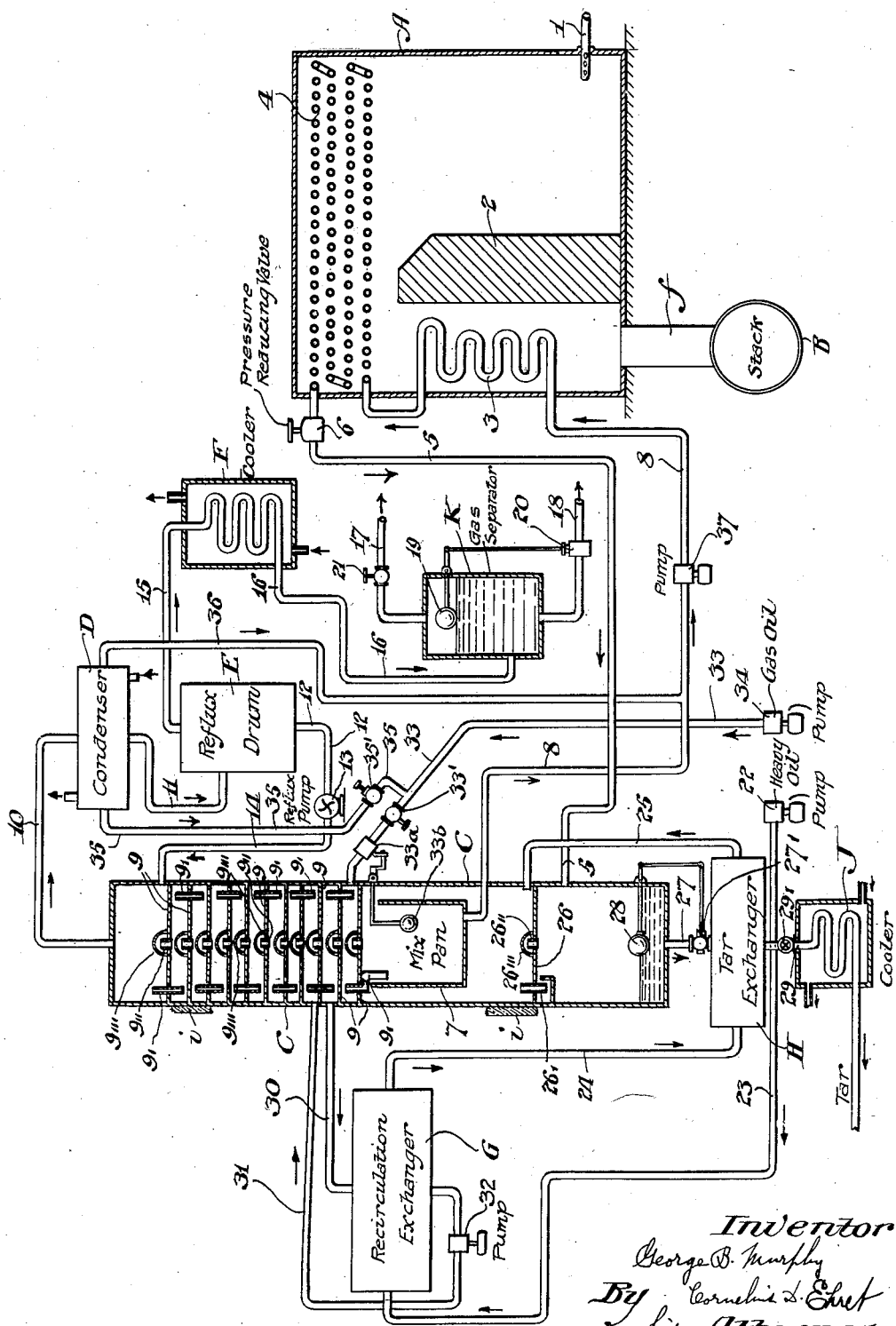

2,000,186

UNITED STATES PATENT OFFICE 2,000,186

CONVERSION OF HYDROCARBON OILS

George B. Murphy, Philadelphia, Pa., assignor to The Atlantic Refining Company, Philadelphia, Pa., a corporation of Pennsylvania Application April 9, 1929, Serial No. 353,872

2 Claims. (Cl. 196—48)

My invention relates to the art of converting relatively high boiling into lower boiling hydrocarbon oils, such for example, as may be suitable for use as motor fuel.

In accordance with my invention, relatively high boiling hydrocarbon oils, particularly petroleum oils, are converted or cracked by passage at relatively high velocities through a tubular heating zone of restricted cross-sectional area, and of such length that the oil is converted to the desired extent into lower boiling compounds, as gasoline, while passing through said heating zone, without recourse to the customary supplementary procedure of maintaining a large body of the oil at or near the cracking temperature for a prolonged period of time.

More particularly, in accordance with my invention, the cracking is conducted under elevated pressure and the velocity of the oil through the tubes is sufficiently great to minimize the deposition on the tube walls of the tar-like, carbon-forming reaction products.

Further in accordance with my invention, the pressure on the cracked products is reduced while they are at elevated temperature, thereby permitting vaporization of the volatile portion of the reaction products. The vapors so evolved, together with those of heavy oil introduced independently to the vaporizing zone, are subjected to dephlegmation to effect separation by condensation of that portion which, due to its relatively high boiling point, is unsuitable for motor fuel. The material thus separated in the liquid state is returned, preferably while still at elevated temperature, to the heating zone for further cracking, while the vapors passing from the dephlegmating zone as such are condensed to produce a fraction suitable for use as motor fuel. The unvaporized portion of the reaction products and the heavy oil which collects in the lower part of the vaporizing zone is preferably withdrawn therefrom, and may be used as a liquid fuel.

For an understanding of my invention and to illustrate one form of apparatus which may be employed in carrying out my process, reference is to be had to the accompanying drawing in which:

A is a furnace heated by combustion, at the burner 1, of a suitable fuel, as oil, the products of combustion passing over the bridge-wall 2 and through the flue f to the stack B. Heating tubes are positioned within the furnace, one section 3 heated by convection and the other section 4 being subjected to radiant heat from the gases in the combustion chamber. From the radiant heat section 4 the line 5, which has an automatic or manually controlled pressure reducing valve 6, leads to the lower portion of the vaporizing section of tower C which is covered with heat insulation $i$.

At an intermediate point in the tower C there is a mix-pan 7 comprising an open top cylindrical container, the diameter of which is less than that of the tower, whereby an annular vapor passage is formed between the outer walls of the pan and the inner wall of the tower. A discharge line 8 leads from this mix-pan to the inlet end of the tubes 3. Positioned above the mix-pan is a plurality of vertically spaced fractionating plates 9, of any desired type suitable for effecting intimate contact between reflux liquid and the vapors, and provided with conventional down-flow pipes 9' and vapor up-takes 9'' covered by caps 9'''. From the upper end of the tower C the line 10 leads to the condenser D which in turn is connected by the line 11 with the reflux-drum E. The line 12 leads from the reflux drum E to the reflux pump 13, which may be, for example, of the centrifugal type, and which discharges liquid through the line 14 onto the uppermost fractionating plate 9 in the tower C. The line 15 leads from the reflux drum E to the cooler F which in turn is connected by the line 16 to the gas separator K from which lead the gas and liquid lines 17 and 18 respectively, the latter controlled by the float 19 operating the valve 20. A gas control valve 21 is positioned in the line 17.

The fresh feed pump 22 delivers liquid oil through the line 23, through the recirculation heat exchanger G hereinafter described, thence through the line 24 to the tar heat exchanger H from which line 25 leads to the vaporizing section of the tower C, preferably entering the tower at an elevation above the point at which line 5 discharges. Plate 26 of the conventional type having overflow pipe 26' and vapor up-take 26'' covered by cap 26''' is preferably interposed between these two inlets of lines 5 and 25 to the vaporizing section of the tower C. From the bottom of the tower the line 27, which is equipped with valve 27' controlled by the float 28, leads to the tar exchanger H, which in turn is connected to the tar cooler J by the line 29 equipped with valve 29'.

Leading from one of the intermediate fractionating plates 9 of the tower C is the line 30 which communicates with the recirculation exchanger G. The line 31, in which there is the pump 32, may lead back to the same or, as shown, a higher plate 9. The line 33 equipped with valve 33' leads from the feed pump 34 to one of the lower fractionating plates 9, or if desired may be connected to the feed line 8 through the line 35, having valve 35', condenser D and line 36. In line 33 is a valve 33a controlled by a float 33b in mix pan 7 to open valve 33a as the liquid level in pan 7 falls.

In carrying out my process in the apparatus above described, high boiling oil, for example, crude oil, is fed by the pump 22 through the line 23 to the recirculation exchanger G, then through line 24 to the tar exchanger H in both of which by heat interchange it is raised in temperature, for example, to about 550 degrees F., and is discharged through the line 25 into the vaporizing section of the tower C. Simultaneously, another relatively high boiling oil, preferably of a different nature than the aforementioned high boiling oil, as for example, gas oil, is fed by the pump 34 through the line 33 onto one of the lower plates 9 in the tower C wherein it is preheated by the passage through it of vapors rising from the vaporizing section as will be hereinafter described. In passing through the liquid on this lower plate, the heavier portion of the vapors is condensed and passes with the preheated fresh charge through the down-flow pipe 9' leading from said plate to the mix-pan 7 from which it is withdrawn through the line 8 and forced by the hot oil pump 37 through the tubes 3 of the furnace A, passing thence through tubes 4. The hot oil coming from the mix-pan 7 is further heated in the tubes 3 and in passing through the tubes 4 its temperature is progressively increased so that substantial cracking occurs while in these tubes 4, with the consequent formation of appreciable quantities of gasoline, before reduction of pressure is effected. By suitably adjusting the temperature and velocity of the oil, sufficient cracking will occur to produce 15 to 20 per cent. motor fuel based on the original charge in a single passage of the oil through the tubes. The high velocity effects efficient heat transfer and minimizes deposition of carbon on the inside of the tube walls. The internal diameter of tubes 4 may be less than that of tubes 3, whereby the velocity of the oil in tubes 4 will be higher than in tubes 3.

The cracked products leaving the tubes 4 pass through the pressure reducing valve 6 and are introduced by means of the line 5 into the lower portion of the tower C, wherein atmospheric or reduced superatmospheric pressure, as for example, of the order of 30 pounds gauge, is maintained. This reduction in pressure permits vaporization of the more volatile portion of the cracked material and the vapors thus formed pass upwardly through the annular space between the mix-pan 7 and the walls of the tower C to the fractionating plates 9, whereupon they are brought into contact with fresh charge, such as gas oil, introduced through line 33, and with reflux oil introduced through line 14. The uncondensed vapors pass from the top of the tower C through the line 10 to the condenser D where they are liquefied and pass through line 11 to the reflux drum E. A portion of the liquid oil from the reflux drum is delivered by the reflux pump 13 through the lines 12 and 14 to the uppermost plate in the tower and passes downwardly through the tower in intimate contact with the upwardly rising vapors. The remaining liquid from the reflux drum E passes through the line 15 to the cooler F where it is cooled to substantially atmospheric temperature, and is discharged through the line 16 to the gas separator K. Liquid condensate from the gas separator K is discharged to storage or other suitable destination through the line 18 controlled by the float controlled valve 20, while gas is discharged through the line 17 controlled by valve 21, and may be used, for example, for fuel.

If desired, a portion of the liquid oil may be withdrawn from a suitable plate in the tower C through line 30, and cooled by heat interchange in the recirculation exchanger G with fresh feed, preferably an oil containing high boiling constituents unsuitable for cracking and lower boiling components which are suitable for cracking, for example, a crude oil, and returned through the line 31 by means of pump 32 to a point at the same or a higher level in the tower. This procedure effects preheating of the charge and removes heat from the tower thereby reducing the quantity of heat to be removed at the top of the tower.

By feeding the highly heated cracked products into the tower below the plate 26 and feeding the preheated crude above this plate, additional heating and vaporization of the crude is obtained due to the passage of the hot vapors through the preheated liquid. By preheating the crude and feeding it into the vaporizing section of the tower, it is possible to utilize as charging stock, crude or other oil which ordinarily is not suitable for cracking due to its content of high boiling constituents and consequent tendency to form carbon in the tubes. This procedure, however, vaporizes that portion of the crude which is desirable as a charging stock, as well as the lighter portions, such as gasoline, leaving the heavy asphalt-like portion in liquid form in the tower from which it is continuously withdrawn through the line 27.

The vaporized portion of the crude is fractionated together with the cracked vapors and that portion suitable as motor fuel is separated from the higher boiling portion, which latter portion condenses in the tower, and, collecting in the mix-pan 7 with the fresh gas oil introduced through line 33, is fed while at elevated temperature through line 8 to the cracking tubes in the furnace.

As an example of my process, a 28° A. P. I. gas oil from a Texas crude is heated to a temperature of about 915° F. while under a pressure of approximately 800 pounds per square inch, then run into the tower C maintained at a pressure of about 30 pounds per square inch. Approximately 2,500 barrels of oil are passed into and through the tubes 3, 4 per day, 900 barrels of which is fresh charge, the remainder constituting insufficiently cracked material which was separated in the tower C and recirculated for further cracking. Under these conditions a once-through yield of 19.5 per cent of motor gasoline is obtained. The final yield of motor gasoline with recirculation of the insufficiently cracked portion is 50 per cent.

These conditions and yields were maintained over a period of the order of six days before it was necessary to shut down the apparatus for cleaning the furnace tubes.

While in the example given above definite temperatures and pressures have been referred to, the process is not to be limited to such conditions; the temperature in the furnace tubes may vary from about 800° to about 1000° F, and the pressure in the tubes may range upwardly from about 150 pounds per square inch, while that in the tower may vary from atmospheric to about 50 pounds per square inch gauge, or higher.

The process described has the advantages of flexible control, ability to handle a variety of charging stocks, conservation of heat, and the elimination of the costly reaction chamber. The elimination of the reaction chamber and the use of high velocities in the furnace tubes results in maintaining the oil at elevated temperature for a relatively short period of time, thereby reducing the quantity of carbon formed during the cracking, and permitting operation for a longer period of time without the necessity of shutting down for carbon or coke removal than is possible with the reaction chamber type processes.

It will be evident that various modifications may be made in the apparatus as described; for example, the vaporizer may be separate from rather than integral with the fractionating column. Further, fresh gas oil may, if desired, by proper manipulation of the valves 33' and 35', be fed through the lines 33 and 35 to the tubular condenser D there to be preheated by the vapors passing through the line 10 from the tower C which vapors in turn would be condensed. After so preheating the gas oil it may then be passed through the line 36 to the line 8 leading to the tubes 3 of the furnace A.

What I claim is:

1. A process for converting relatively high boiling hydrocarbon oils into lower boiling oils, which comprises passing a high boiling distillate through a heating zone of restricted cross-sectional area, raising the temperature of the oil during its passage through the heating zone to effect conversion of a substantial portion thereof, maintaining superatmospheric pressure on the oil while in the heating zone, reducing the pressure on the cracked products and introducing them into a vaporizing zone at lower pressure whereby vaporization of sufficiently and insufficiently cracked products is effected, passing the vapors produced to a dephlegmating zone, separating the insufficiently cracked portion by condensation therein, returning said portion to the cracking zone for further conversion, continuously removing liquid from a point in the dephlegmating zone, passing said liquid in indirect heat exchange with a secondary charging stock containing high boiling constituents unsuitable for cracking and lower boiling components suitable for cracking whereby the secondary charging stock is heated and the removed liquid cooled, returning the removed liquid to the dephlegmating zone at a point adjacent the point of withdrawal, introducing the secondary charging stock into the vaporizing zone to effect vaporization of a lower boiling portion thereof, passing the vapors produced to the dephlegmating zone in mixture with the vapors of the cracked products, and withdrawing from the vaporizing zone the nonvolatile portion of the reaction products in mixture with the residue of the secondary charging stock.

2. A process for converting relatively high boiling hydrocarbon oils into lower boiling hydrocarbon oils which comprises subjecting oil to cracking under super-atmospheric pressure in a cracking zone, passing the cracked products into a vaporizing zone wherein vaporization under reduced pressure takes place, dephlegmating the resulting vapors by direct contact with a charging stock comprising residual constituents of crude petroleum, preventing unvaporized portions of said crude petroleum from entering said cracking zone, passing vapors comprising vaporized portions of said charging stock and uncondensed vapors of the cracked products through a fractionating zone, dephlegmating the vapors in said fractionating zone by direct contact with a condensate charging stock, withdrawing from said fractionating zone a liquid product comprising unvaporized constituents of said condensate charging stock and condensed portions of said vapors uncontaminated with unvaporized portions of said charging stock first mentioned, conducting said liquid product to said cracking zone, condensing a vapor fraction from said fractionating zone to form a final light distillate and preheating said charging stock first mentioned, first by indirect heat exchange with condensate formed at an intermediate point in said fractionating zone, and second by indirect heat exchange with unvaporized tar formed in said vaporizing zone, prior to the contacting thereof with the vapors separated in said vaporizing zone.

GEORGE B. MURPHY.